(12) United States Patent
Andrews et al.

(10) Patent No.: US 8,209,062 B2
(45) Date of Patent: Jun. 26, 2012

(54) METHOD FOR NON-INTRUSIVE LOAD MONITORING USING A HYBRID SYSTEMS STATE ESTIMATION APPROACH

(75) Inventors: Burton Andrews, Pittsburgh, PA (US);
Diego Benitez, Pittsburgh, PA (US);
Badri Raghunathan, San Jose, CA (US); Akshay Rajhans, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 12/639,472

(22) Filed: Dec. 16, 2009

(65) Prior Publication Data

US 2011/0144819 A1    Jun. 16, 2011

(51) Int. Cl.
  *G05D 3/12* (2006.01)
  *G01R 21/06* (2006.01)
  *G01R 27/00* (2006.01)
(52) U.S. Cl. .............. 700/291; 702/60; 702/62; 702/65
(58) Field of Classification Search .............. 700/291; 702/60, 62, 65
See application file for complete search history.

(56) References Cited

U.S. PATENT DOCUMENTS

| | | | | |
|---|---|---|---|---|
| 4,858,141 | A | * | 8/1989 | Hart et al. .............. 702/61 |
| 5,483,153 | A | * | 1/1996 | Leeb et al. .............. 324/76.12 |
| 7,409,303 | B2 | * | 8/2008 | Yeo et al. .............. 702/60 |
| 7,693,670 | B2 | * | 4/2010 | Durling et al. .............. 702/62 |
| 8,014,964 | B1 | * | 9/2011 | Khalsa .............. 702/60 |
| 2011/0004421 | A1 | * | 1/2011 | Rosewell et al. .............. 702/45 |
| 2011/0071885 | A1 | * | 3/2011 | Ayres de Castro et al. ..... 705/10 |

FOREIGN PATENT DOCUMENTS

| | | |
|---|---|---|
| JP | 2007003296 A2 | 1/2011 |
| WO | 2009103998 A2 | 8/2009 |

OTHER PUBLICATIONS

Michael W. Hofbaur and Brian C. Williams; "Hybrid Estimation of Complex Systems"; IEEE Transactions on Systems, Man, and Cybernetics, Part B: Cybernetics, vol. 34, No. 5, Oct. 2004. (14 pages).

(Continued)

*Primary Examiner* — Kakali Chaki
*Assistant Examiner* — Sivalingam Sivanesan
(74) *Attorney, Agent, or Firm* — Taft Stettinius & Hollister, LLP; Keith J. Swedo, Esq.

(57) ABSTRACT

A method for non-intrusively monitoring a load including a plurality of appliances includes retrieving a plurality of mathematical models for modeling operation of a respective subset of the appliances. A value of a respective operational parameter is predicted for each of the subsets of appliances. An output of the load is measured. A respective value of each of the operational parameters is calculated based on the mathematical models and the outputs of the load. The predicting, measuring and calculating steps are repeated until a metric pertaining to a difference error between the measured output and the predicted output calculated from the operational parameter and the mathematical models is equal to or below a threshold for one of the subsets of appliances. It is decided that the one subset of appliances is currently operating whose metric pertaining to a difference error is equal to or below the threshold.

20 Claims, 7 Drawing Sheets

OTHER PUBLICATIONS

I. Hwang, H. Balakrishnan and C. Tomlin; "State Estimation for Hybrid Systems: Applications to Aircraft Tracking"; The Institution of Engineering and Technology 2005; IEE Proceedings online No. 20050053; doi:10.1049/ip-cta:20050053. (11 pages).

Leslie K. Norford and Steven B. Leeb; "Non-Intrusive Electrical Load Monitoring in Commercial Buildings Based on Steady-State and Transient Load-Detection Algorithms"; Massachusetts Institute of Technology, Cambridge, MA; Revised Sep. 17, 1995; 1996 Elsevier Science S.A.; SSDI0378-7788(95)00958-Z. (14 pages).

Yu Yi-Xin, Li Peng, and Zhao Chun-Liu, "Non-Instrusive Method for On-Line Power Load Decomposition"; Key Laboratory of Power System Simulation and Control of Education, Tianjin University, Tianjin, 300072; CICED2008; XP-002628133; S1-20 CP1426 (8 pages).

Jian Liang, Simon K.K. Ng, Gail Kendall and John W. M. Cheng; "Load Signature Study—Part I: Basic Concept Structure and Methodology";; IEEE Transactions on Power Delivery, vol. 25, No. 2, Apr. 2010 (10 pages).

* cited by examiner

Combined Matrices:

$$\text{new } A = \begin{bmatrix} A_1 & & \\ & A_2 & \\ & & A_3 \end{bmatrix}$$

$$\text{new } B = \begin{bmatrix} B_1 & & \\ & B_2 & \\ & & B_3 \end{bmatrix}$$

$$\text{new } C = [\, c_1 \ \ c_2 \ \ c_3 \,]$$

$$\text{new } D = [\, d_1 \ \ d_2 \ \ d_3 \,]$$

FIG. 5a

New state Vector:

$$\text{new } x = \left[\begin{array}{c} x_1 \\ \hline x_2 \\ \hline x_3 \end{array}\right] \begin{array}{c} \updownarrow n_1 \\ \updownarrow n_2 \\ \updownarrow n_3 \end{array}$$

New Input Vector:

$$\text{new } u = \left[\begin{array}{c} u_1 \\ \hline u_2 \\ \hline u_3 \end{array}\right] \begin{array}{c} 1 \\ \hline 1 \\ \hline 1 \end{array}$$

Dimensions of the Matrices

| | $n_1$ | $n_2$ | $n_3$ | | 1 | 1 | 1 |
|---|---|---|---|---|---|---|---|
| $n_1$ | $A_1$ | | | | $b_1$ | | |
| $n_2$ | | $A_2$ | | | | $b_2$ | |
| $n_3$ | | | $A_3$ | | | | $b_3$ |
| $n_y$ | $C_1$ | $C_2$ | $C_3$ | | $d_1$ | $d_2$ | $d_3$ |

$n_1, n_2, n_3$ = # states of models 1, 2, 3

$n_y$ = # outputs (e.g., real, reactive, multiple phases, etc.)

FIG. 5c

METHOD FOR NON-INTRUSIVE LOAD MONITORING USING A HYBRID SYSTEMS STATE ESTIMATION APPROACH

BACKGROUND OF THE INVENTION

1. Field of the Invention

The present invention relates to methods for monitoring the electrical load within a building, and, more particularly, to methods for monitoring the electrical load status within a building in a non-intrusive way.

2. Description of the Related Art

The price and consumption of energy throughout the world has been increasing dramatically over recent years and is expected to continue along this trend in the years to come. For example, according to the U.S. Department of Energy Annual Energy Outlook, total residential energy consumption is expected to increase by approximately twenty percent from 2007 to 2030 despite efficiency improvements. This is attributed to a number of factors including a projected twenty-four percent increase in the number of households and an approximately seven percent increase in the share of electricity attributed to "other" appliances such as home electronics. Increases in residential electricity consumption are accompanied by a projected 1.4 percent increase per year in commercial electricity consumption. Given these figures, and the fact that residential and commercial buildings comprise the largest energy consumer segment in the U.S., accounting for seventy-two percent of U.S. electricity consumption and forty percent of all energy use in the U.S., the recent push for technological solutions that increase energy awareness and efficiency are of no surprise.

To achieve energy efficiency goals, appliances or devices can be replaced with more energy efficient alternatives, building occupants or owners can alter their behavior to reduce the use of energy-consuming devices, or automated building management solutions can control the operation of devices in the building so as to achieve less energy consumption or schedule operation for non-peak demand periods to reduce energy costs. All of these approaches must be based on detailed knowledge of the amount of energy consumed by each device currently in the building and its periods of operation so that appropriate decisions can be made about how to reduce this consumption. Measurement of energy consumption may be called for in order to make decision-makers aware of patterns of past energy consumption which may carry over into the future. Such decision-makers may be human or automated.

A number of systems exist for measuring energy consumption in a building and reporting this to users. However, these systems typically report to the user only the total amount of electricity consumption for the entire building. In order to obtain truly detailed information that is most informative for determining how to achieve energy savings, the user must manually switch devices on and off and note the change in the total consumption report. Most current systems lack any disaggregated reporting of the consumption and use patterns of individual devices and appliances. Some exceptions are systems that use separate measurement devices to measure the electricity consumption of, for example, a sub-circuit of the building, an individual wall outlet, or even an individual device itself; however, use of multiple metering devices distributed throughout the building to achieve this type of feedback is both costly and cumbersome to install.

An alternative solution to the above is a single-point measurement system that non-intrusively detects which appliances and devices are turned on and off in a building. This concept has been worked on for years under several different names such as Non-Intrusive Load Monitoring (NILM), Non-Intrusive Appliance Load Monitoring (NIALM), Non-Intrusive Power Monitoring (NIPM), and Non-Intrusive Transient Classification (NITC). In general, previous non-intrusive load monitoring solutions commonly rely on two separate processing components: (1) a signal event detector to detect a change in the total electrical load that may have been caused by an appliance transition of interest; and (2) a classification algorithm that classifies features computed from the signal surrounding the event as belonging to a particular appliance transition based on a trained classification algorithm. One disadvantage of this approach is the need for the event detector which may lead to false positives or missed events and consequently inaccurate or missed classifications of the active appliances. Additionally, the degree to which the classification leverages the electrical load dynamics associated with a particular appliance depends solely on the features extracted from the signal and used in the classification. For instance, most of the features used in the machine learning algorithms center around changes in certain characteristics of the electrical load that occur around the event, such as changes in real power or the magnitude/phase of higher order harmonic contributions. The full range of dynamics is truly reflected only if an inordinate number of features are used. Furthermore, classification algorithms require several instances of a particular class or event to be trained into the system to be able achieve good results. This training process is also tedious and in many cases unpractical.

Additional approaches to nonintrusive load monitoring rely on continuously comparing scaled (in time and magnitude) versions of a template of a device event transient to the actual power signal being observed. Residuals computed from this comparison are used to estimate which appliance is responsible for the observed event. This approach is advantageous over the previously described event classification approaches in that a separate event detector need not be required (comparisons are made at all times), and the general shape of the transient is used in the comparison instead of just relying on a set of computed features to classify.

Non-intrusive load monitoring solutions have also been proposed that involve a combination of the above approaches. That is, a complete system may comprise an event detector followed by a combination of a steady-state change classifier (to identify which appliance or device most corresponds to the overall power consumption change) and a transient classifier (to select the best-matching signal transient template from a list of stored templates). These approaches may be implemented in parallel or series along with heuristics or optimal search algorithms so as to reduce computation time of searching over the space of all possible appliance events. Furthermore, other tools have been proposed to resolve potential errors that may accumulate with misclassification of events; these include finite state machine logic (to ensure, for example, that appliance A cannot turn on if it is already on) or a steady-state analysis tool that operates between events to refine the set of possible transitions that can occur with an event.

However, disadvantages of the above approaches still remain. First, they lack any direct use of models of the actual physical dynamics of the appliances in the estimation or classification process. Some work has been done on using physically-based dynamical system models in load diagnostics (e.g., fault detection); however, leveraging these dynamics for both state (of the appliance) estimation and the estimation of which appliances are turning on/off has not been done. Another disadvantage of prior art is the need for (local) batch processing of a power signal to perform the appliance classification instead of a truly iterative approach that is more conducive to implementation in a real, potentially embedded, system. Finally, previous approaches involve a separate treatment of events instead of a holistic view of a large system comprised of different operating modes or states that may have certain transition probabilities induced by user behavior or appliance operating modes (e.g., multi-state appliances). The invention described below proposes a solution that improves upon these disadvantages.

What is neither disclosed nor suggested in the art is a system and method for electrical load monitoring that overcomes the problems and limitations described above.

SUMMARY OF THE INVENTION

The present invention may provide a method for detecting, from single point measurement of the total building electrical load, disaggregated information about individual use and consumption of appliances and devices that are present in a building. The method of the invention, which may be based on the concept of hybrid systems, may be an alternative and a more robust approach to the technology known as non-intrusive load monitoring that has existed for longer than twenty years, but has not seen successful implementation in real buildings, particularly in the residential sector, due to several reasons.

In one embodiment, the hybrid systems method of the invention may model each individual appliance or device in the building as having continuous dynamics, and may further model the interconnection of these continuous appliance models as a discrete state system. State estimation techniques may then be used for this hybrid continuous-discrete system to determine, based on a measurement of the total electrical load of the building, which discrete state (e.g., appliance) is currently active as well as the continuous state of the appliance. The method of the invention may use the known dynamics of the load in the load detection by performing an estimation technique on a hybrid model of the loads. The hybrid approach of the invention may compute state estimates without the need for an event detector, and may directly account for the physical dynamics inherently associated with each appliance. These benefits of the invention may lead to a potentially more robust load monitor with greater accuracy and fewer false positives and less false negatives. Additionally, aspects of the estimation process may be easily used for additional applications such as learning of behavior patterns in appliance use or monitoring performance degradation of devices.

The invention comprises, in one form thereof, a method for non-intrusively monitoring a load including a plurality of appliances. A plurality of mathematical models are retrieved for modeling operation of a respective one of the appliances. A value of a respective operational parameter is predicted for each of the appliances. An output of the load is measured. A respective value of each of the operational parameters is calculated based on the mathematical models and the outputs of the load. The predicting, measuring and calculating steps are repeated until a difference error between the predicted value and the corresponding calculated value of the operational parameter is below a threshold for one of the appliances. It is decided that the one appliance is currently operating whose difference error is below the threshold.

The invention comprises, in another form thereof, a method for non-intrusively monitoring a load including a plurality of appliances. A plurality of mathematical models are retrieved for modeling operation of each of the appliances as having continuous dynamics, and for modeling the appliances conjunctively as a discrete state system. A value of a respective operational parameter is predicted for each of the appliances. An output of the load is measured. A respective value of each of the operational parameters is calculated based on the mathematical models and on the outputs of the load. It is decided which of the appliances has most recently began operating based upon the predicted and calculated values of the operational parameters of the appliances.

The invention comprises, in yet another form thereof, a method for non-intrusively monitoring a load including a plurality of appliances. A plurality of mathematical models are obtained. Each of the models is for modeling operation of a respective one of the appliances. Each of the models is of the form:

$$\frac{dx_n}{dt} = A_n x_n(t) + B_n u(t)$$
$$y(t) = C_n x_n(t) + D_n u(t)$$

wherein $x_n$ is a continuous state vector of an $n^{th}$ appliance, u(t) is a step voltage input to a corresponding appliance, y is an output of each discrete state of the load, and each of $A_n$, $B_n$, $C_n$ and $D_n$ is a coefficient corresponding to the $n^{th}$ appliance. A value of $x_n$ is predicted for each of the appliances. A value of y is measured. A respective value of $x_n$ is calculated for each of the appliances. The calculating is based on the mathematical models and the measured value of y. It is decided which of the appliances has most recently began operating. The deciding is based upon the predicted and calculated values of $x_n$.

The invention comprises, in still another form thereof, a method for non-intrusively monitoring a load including a plurality of appliances. A plurality of mathematical models are formulated from the knowledge about the physics of the device or are identified by reverse engineering techniques such as systems identification for modeling the operation of each respective appliance. A value of respective operational parameters is predicted for each of the appliances. An output of the load is measured. A corrective value of each of the operational parameters is computed based on the mathematical models and the measured output of the load. The predicting, measuring and corrective steps are repeated, computing at each time step a metric pertaining to the error between the measured output and the predicted output calculated from the operational parameter and the mathematical models. The error metrics are combined with scaling parameters (e.g., probabilities) from the discrete state model such as transition probabilities between discrete states (e.g., corresponding to transitions between appliances) to arrive at a measure of probability of each discrete state of the system as currently being active. It is decided that the current discrete state is the one with the highest probability of being active.

The invention comprises, in another form thereof, a method for non-intrusively monitoring a load including a plurality of appliances. A plurality of mathematical models are formulated/identified for modeling operation of each of the appliances as having continuous dynamics, and for modeling the appliances conjunctively as a discrete state system. A value of a respective operational parameter is predicted for each of the appliances. An output of the load is measured. A respective value of each of the operational parameters is calculated based on the mathematical models and on the outputs of the load. It is decided which of the appliances has most recently began operating based upon the predicted and calculated values of the operational parameters of the appliances.

The invention comprises, in yet another form thereof, a method for non-intrusively monitoring a load including a plurality of appliances. A plurality of mathematical models are obtained. Each of the models is for modeling operation of a respective one of the appliances. Each of the models is of the form:

$$\frac{dx_n}{dt} = A_n x_n(t) + B_n u(t)$$
$$y = C_n x_n(t) + D_n u(t)$$

wherein $x_n$ is a continuous state vector of an $n^{th}$ appliance, u(t) is a step voltage input to a corresponding appliance, y is an output of each discrete state of the load, and each of $A_n$, $B_n$, $C_n$ and $D_n$ is a coefficient corresponding to the $n^{th}$ appliance. A value of $x_n$ is predicted for each of the appliances. A value of y is measured. The estimated value of $x_n$ is corrected for each of the appliances based on the newly observed measurement. The calculating is based on the mathematical models and the measured value of y. It is decided which of the appliances has most recently began operating. The deciding is based upon error metrics computed from the predicted and calculated values of $x_n$.

In one embodiment, each discrete state or mode of the system may represent a combination of multiple appliances or devices being on/off. For example, one state may correspond to appliance 1 and 3 being on with 2 being off, another state may correspond to appliance 1 being on with 2 and 3 being off, and yet another may correspond to all three being off or on for a simple example with only three appliances.

Some of the potential benefits and possible implementations of the present invention are summarized below:

1. The voltage and current may be measured at only the main electrical feed of the building, and this measurement may be used as the observation for an estimation algorithm that determines which appliances and devices are currently in which state or operating mode (e.g., washing machine on or off, fan at medium setting, etc.).

2. A model for the entire electrical load of the building may be assumed as consisting of a number of continuous-time linear or nonlinear system models. Each appliance or device transitioning into a different operating mode (e.g., on, off, medium setting, low, high, washing, drying, heating, cooling, etc.) may correspond to a respective one of these system models becoming active. Further, each operating mode of each appliance or device may be considered to be a respective one from a set of discrete states of the entire system. These discrete states of the system and the transitions between them may be modeled as part of a discrete-event or a hybrid system, e.g., where each discrete state has its own dynamics according to its mathematical model and a certain probability of transitioning to another discrete state. The state transitions may be governed by certain conditions that enable or disable the transitions and the starting point (initial conditions) of the dynamics in the new discrete state are some function of the last value of the old discrete state just before the transition. Without the continuous dynamics, the probabilistic discrete transition system can also be thought of as a Markov chain.

3. Estimation techniques may be used for hybrid systems that provide a present estimate for both the discrete state (e.g., the appliance operating mode) and the continuous state (e.g., the state of the continuous linear or nonlinear system corresponding to that operating mode).

4. An estimate of the continuous and discrete state may be obtained for all points in time as determined by the sampling rate of the measurements or observations of the total load.

5. The system model, particularly the continuous models for each appliance, used in the estimation strategy may be obtained through a repository of appliance dynamics stored either locally on the load monitoring system or remotely on, for example, an internet database.

6. Alternatively to item 5 above, the system model, particularly the continuous models for each appliance, may be learned automatically using numerous well-known systems identification techniques that learn the parameters of a model given the model input and output. These systems identification techniques can be performed either once as a training phase when new appliances or devices are installed in the building, or through a dynamic prompting of the user. For example, if the state estimation returns a high probability of the current state not belonging to any of the known discrete states, then the user may be asked through a user interface to identify the unknown appliance corresponding to the unknown state, and systems identification techniques can be used to learn the dynamics of the new state and update the overall hybrid model accordingly.

7. Multiple transitions that are all part of the operation of a single appliance can be directly accounted for in the hybrid system model by treating each transition dynamic as a separate discrete state with its own model. Moreover, the transition between these discrete states which likely follows a particular routine (e.g., the various phases of a washing machine operating cycle) can be directly modeled (either as a given model or learned through systems identification) to capture the complete dynamics of multi-phase appliances and provide greater estimation accuracy for which devices are running at what operating modes in the building. For instance, transitions among the discrete states belonging to a multi-stage appliance may adhere to certain fixed probabilities that represent the sequence of stages of the appliance.

8. The model of discrete event (e.g., appliance) transitions can be preset to an initial condition that is either fixed or specified by the user so that the hybrid estimator can achieve reasonable estimates of state transitions. For instance, an initial condition may be an equal transition probability to all other appliances, or the user may specify particular appliance transition sequences as being more appropriate for that user's behavior of operating appliances. Consequently, the state estimates may be more accurate for that particular user.

9. The method may learn and update the discrete event model over time to obtain a more accurate model of the building user's appliance consumption or operation behavior for additional applications such as energy management (e.g., deciding when to purchase electricity if the price varies with time-of-day, when to store electrical energy in a storage system, etc.). This may be advantageous in that the learned behavioral model may be a byproduct of the hybrid non-intrusive load monitoring method and thus may not need to be learned as part of a separate system.

10. The hybrid observer method may be implemented on a variety of platforms such as an embedded system that is connected to the main electrical feed of the building or a local or remote computer system. 11. Appliance state estimations may be used to provide energy consumption feedback to the user or as an input to an automatic energy management system.
12. A learned behavioral model from the discrete event transitions may be fed back to the user for energy saving suggestions or as an input to an automated energy management system.
13. Estimates of the continuous state of the appliance available from the estimation process may be used to update the accuracy of the device model with each occurrence of the device transition.
14. Estimates of the continuous state of the appliance may be compared with the device model to detect significant errors that may be indicative of device failure or performance degradation, in which case the user may be automatically notified.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5a is a diagram of combined matrices according to yet another embodiment of a method of the present invention for non-intrusively monitoring a load.

FIG. 5b is a diagram of a new state vector and new input vector for the method of FIG. 5a.

FIG. 5c is a diagram of the dimensions of the matrices for the method of FIG. 5a-b.

Figure 1:
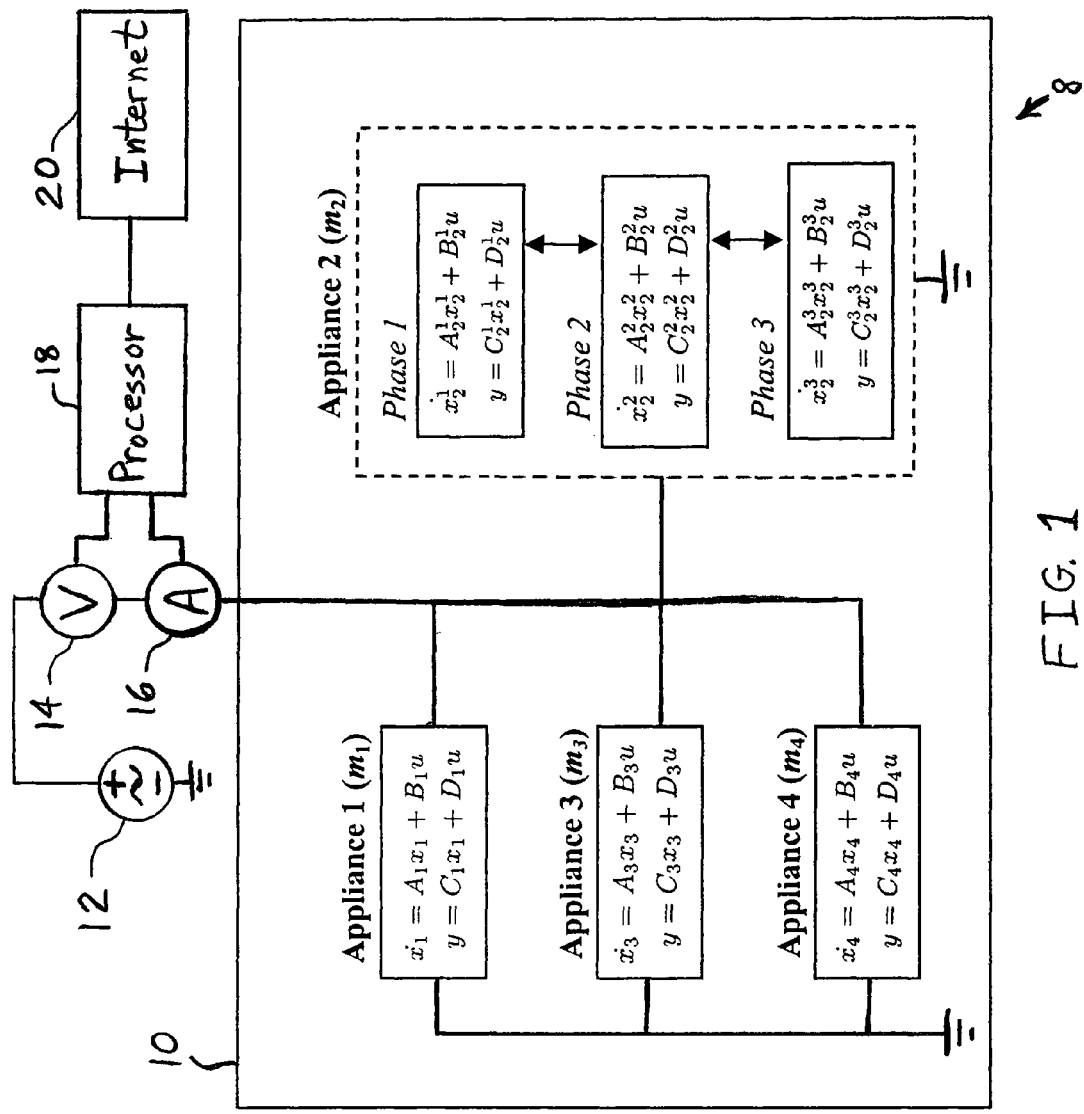
FIG. 1 is a block diagram of one embodiment of a non-intrusive load monitoring arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Shown in FIG. 1 is one embodiment of a non-intrusive load monitoring arrangement 8 of the present invention including appliances 1-4 disposed within a building 10. Appliances 1-4 are powered by a voltage source 12, which may be power lines or an electrical grid provided by a public utility company. Disposed in association with the main power line leading into building 12 are a voltage meter 14 and a current meter 16. Voltage meter 14 may continuously measure the voltage being supplied to building 10. Current meter 16 may continuously measure the electrical current flowing into building 10. The voltage and current readings from meters 14, 16 may be transmitted to an electrical processor 18, such as a microprocessor, which may include memory. Although meters 14, 16 and processor 18 are shown as being disposed outside of building 10, any or all of these components may be disposed inside building 10. Processor 18 may be communicatively coupled to a local or remote central database using any wired or wireless communication protocol such as wifi, Bluetooth, powerline, the Internet, etc 20, from which processor 18 may receive mathematical models of the electrical characteristics of appliances 1-4 or other information about appliances 1-4, as disclosed in more detail hereinbelow. Processor 18 may also be communicatively coupled to portable or stationary display devices where the detected mode is communicated to the user, e.g., a human machine interface, a computer, a handheld device such as a smart phone or any other mobile or stationary smart device.

Also shown in FIG. 1 is a basic hybrid model assumption of connected electrical loads in building 10 according to one embodiment of the invention. Each appliance or device in building 10 may be modeled as a continuous linear or non-linear system. FIG. 1 illustrates only one example for this type of continuous model wherein each appliance's dynamics are modeled using a linear state space representation.

Figure 2:
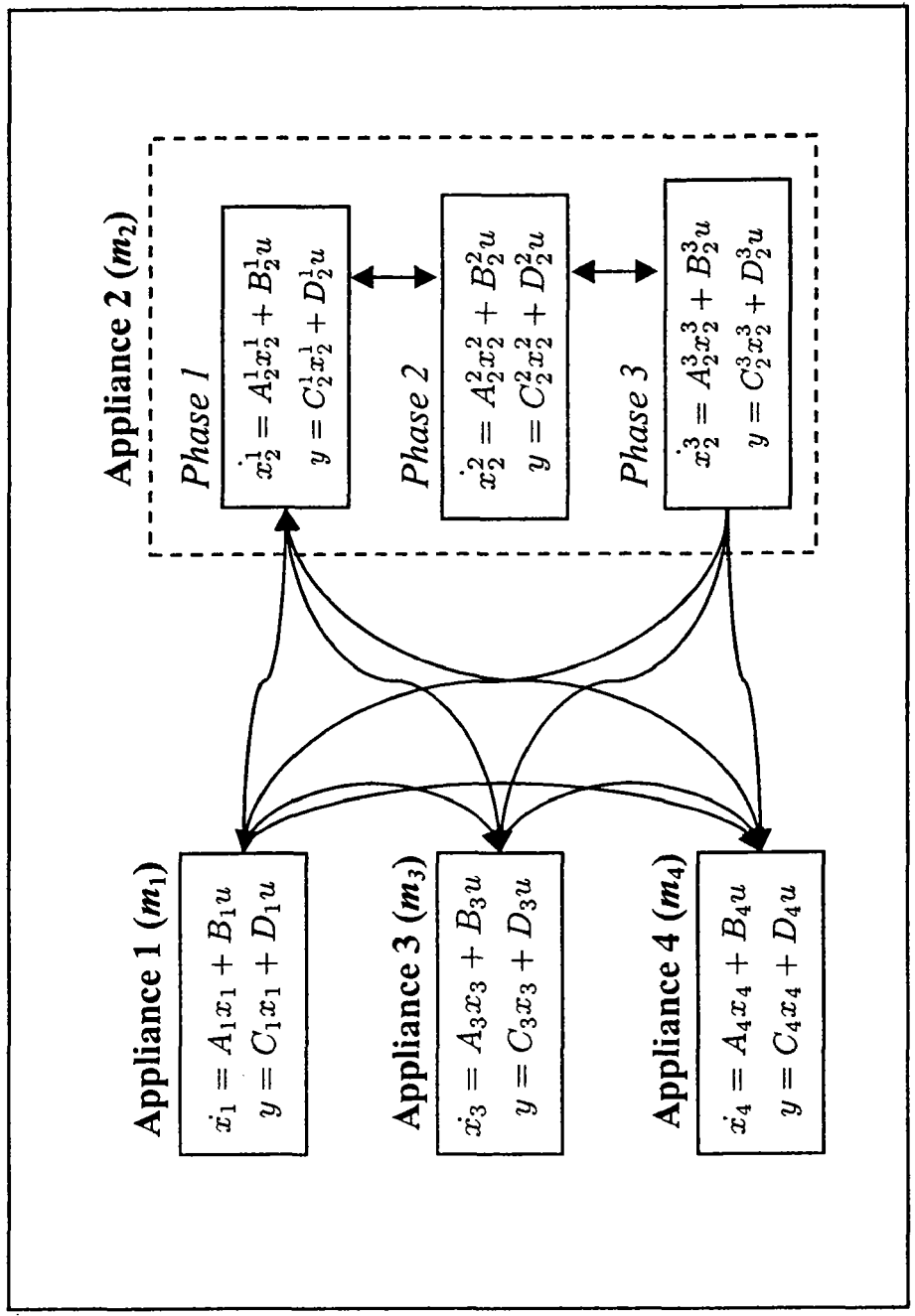
FIG. 2 is a block diagram of the appliances of the arrangement of FIG. 1 illustrating possible transitions between the discrete states.

The model for appliance i may be considered to correspond to a discrete state $m_i$ of the overall system. Possible transitions between the discrete states are indicated in FIG. 2 by the arrows. It is assumed in FIG. 2 for simplicity of illustration that only one appliance can operate at a time. However, it is also possible for multiple appliances to operate simultaneously, and each combination of simultaneously operating appliances may correspond to a discrete state of the overall system. In case of simultaneous operations of the devices, the superposition of the individual appliance dynamics may be used to determine the dynamics of the devices acting together simultaneously. Alternatively, the output can be thought of as a weighted sum of the outputs of individual appliances where the weights or scaling parameters have values corresponding to the operating modes of the devices (e.g., say 0 and 1 for off and on, and so on). In this case, a single model for each appliance (or stage of an appliance) may be used for each discrete state, and simultaneously operating appliances may be accounted for by determining the best combination of weights of each appliance that would result in or resemble the dynamics of the combined total load (and appliance set) that is currently operating in the building.

Once a transition to a new discrete state occurs, the continuous dynamics of that appliance or state take effect. The continuous state vector x of each appliance may contain elements that each represents a relevant state of the appliance. The physical representation of x may vary from appliance to appliance and depends on the model of the appliance that is either available from an appliance model repository (e.g., on a local database or a remote database accessible via internet 20) or from a learned system model using systems identification techniques. A basic example of a physical state element may be the current flowing through the appliance or some $n^{th}$ order derivative of the current. In general, though, this physical connection need not be available for the system to be successful. All that is needed is an accurate model representation of the continuous system; systems identification approaches can achieve this without necessarily providing context for the states of the resulting model.

Some appliances, such as appliance 2 in FIGS. 1-2, may have multiple stages that can be modeled as multiple continuous systems, and therefore as additional discrete states of the overall system. The transitions between these models for each stage are likely much better defined with transition probabilities that reflect a particular sequence that is typical for the appliance. Examples of such a particular sequence may include the wash cycles for a washing machine or the startup sequence for a television.

The output y of each discrete state is the measurable parameter available from sensing at the main electrical feed of the building (e.g., voltage, current, or power measurements), and the input u to each discrete state is assumed to be some quantity that triggers the dynamics of each discrete state to initialize. One example for u is a step voltage input corresponding to the appliance being triggered by a voltage input from the building when it is turned on by a user or some other entity.

Although the dynamic models of each appliance or device may be referred to herein as "continuous", the models used for real implementation of this method on a computing device may be discrete-time models with sampling times determined by the sensing equipment and data acquisition hardware used. The discrete-time representation of the continuous appliance models for computational purposes, however, is not to be confused with the discrete event dynamics that govern the transitions from appliance to appliance in the overall hybrid model.

In one embodiment, a method for achieving non-intrusive load monitoring using the above hybrid system model can be stated as estimating the discrete state m and continuous state x of the system given the measured output y. This estimation can be achieved by a variety of different computational approaches that, in general, may perform multiple state estimations for various possible trajectories corresponding to the different possible discrete-event sequences of the model. State estimation for the continuous state can be achieved using approaches such as a continuous time observer or Kalman filter, and the most probable trajectory may be chosen as the current state. An example of such an approach is described in "Hybrid Estimation of Complex Systems", M. W. Hofbaur, B. C. Williams, IEEE Transactions on Systems, Man, and Cybernetics—Part B: Cybernetics, vol. 34, no. 5, pp. 2178-2191, which is incorporated by reference herein in its entirety. According to the above-identified article by Hofbaur and Williams, a tree of possible trajectories $\hat{x}_k^{(j)}$ (the $j^{th}$ trajectory at time k) is constructed as time evolves. The current state is estimated to be the most probable current trajectory, that is, the trajectory for which the probability $P(\hat{x}_k^{(j)}|y_k,u_k)$ of the trajectory given the current output $y_k$ and input $u_k$ is largest. $P(\hat{x}_k^{(j)}|y_k,u_k)$ may be computed by first constructing at time k−1 all possible discrete states that can be assumed at time k along with their probabilities according to the discrete transition probabilities of the system (this step may account for the discrete dynamics of the system). Then, once an observation is available at time k, all of these possible trajectories up to time k may be updated using a Kalman filter that computes the probability of observing the measurement based on the continuous dynamics associated with each discrete state. This step may account for the continuous dynamics of the system. This process may be repeated for each time step to obtain an estimate of the system state at all times.

In another embodiment, instead of tracking possible trajectories or the possible discrete-event sequences of the model, wherein the trajectories or the sequences store the history of the discrete states the systems has been through, only the current discrete state may be tracked directly. The history of the discrete states that the system goes through up until a given point in time is indirectly captured by the conditional probability density function as presented in "State estimation for hybrid systems: applications to aircraft tracking", I. Hwang, H. Balakrishnan and C. Tomlin, IEE Proc.—Control Theory Appl., Vol. 153, No. 5, September 2006, which is hereby incorporated by reference herein in its entirety. The section 3 of this article by Hwang et al. cites a generic hybrid system estimation algorithm called the multiple model adaptive estimation (MMAE) algorithm in which, during hypothesis testing, the residuals of the different Kalman filters for each mode are used to form functions that reflect the likelihood that estimates of each of the different modes is the correct one. These functions, called likelihood functions, serve as adaptive weights. In cases where the continuous state variables correspond to some physical intuition and can be related across all the different continuous models, the state estimate can be chosen to be the weighted sum of the state estimates computed by individual Kalman filters. In certain cases, however, the continuous state variables across different models may not correspond to each other, in which case, the state estimate can be chosen as the state of the most likely mode. Correspondingly, the estimated output is either the weighted sum of the outputs of individual Kalman filters or the output of the most likely correct Kalman filter. In MMAE, the individual Kalman filters matched to the different modes run independently. The mode estimate at time k is chosen to be the mode which has the maximum mode probability at that time. The mode probability depends not only on the finite Markov chain (discrete dynamics) but also on the likelihood produced by each Kalman filter (continuous dynamics). The article by Hwang et al. also cites in section 1, some references to other related work where similar techniques have been developed to related variants and applications of the hybrid state estimation problem.

In one embodiment, multiple appliances can be estimated as being on by subtracting the expected output value given the current estimated mode from the measured output and then performing the estimation computations on the resulting output measurement.

In another embodiment, the mixed continuous-discrete state estimation can be cast as a mixed integer optimization problem. Rather than treating each appliance as a separate model, a single state space model (i.e., with A, B, C, and D parameters) is used to represent ALL appliances. The A matrix is made up of $A_1, A_2, A_3$; the B matrix is made up of $B_1, B_2, B_3$, etc., where each of these sub-matrices comes from the individual appliances, as illustrated in FIG. 5a. The input (u) to the model is then treated as a random multi-dimensional vector of ones and zeros (FIG. 5b) that correspond to a combination of the appliances being on/off. The state estimation problem then boils down to an optimization problem to determine what input sequence would be most likely to result in a particular measured value of the output of the load (and thus what the most likely sequence of appliances being on/off is).

The individual dynamics pertaining to each individual appliance can be appended into a single big system dynamics model (FIG. 5c) where different discrete (alternatively modeled as Boolean) inputs can be thought to drive different sections of the dynamics, which lead to different discrete states. The value of these inputs are considered unknown, and the goal in such a case is then to determine the best possible sequence of (continuous) states as well as the Boolean inputs that drive the different sections of the system. The Boolean inputs can be assumed to evolve probabilistically according to a Markov chain with certain transition probabilities of the inputs going from off to on or on to off. The optimization problem is then, having observed a sequence of power consumption trace for a certain time period, trying to find the best guess of the sequence of mixed states as well as Boolean inputs that the system could have seen during that time period. A convex relaxation of the mixed integer optimization problem is relatively less computationally expensively, and can yield a (sub)optimal solution that may be a 'good' solution, if not the 'best' solution, which is given by solving the actual mixed integer optimization problem. This would mean finding out a highly likely sequence of states and inputs the system had for the particular time window of interest, if not the most likely sequence. One possible way to solve the convex relaxation of such an optimization problem is presented in the paper "Mixed State Estimation for a Linear Gaussian Markov Model" by Argyrios Zymnis, Stephen Boyd and Dimitry Gorinevsky, presented in the 47$^{th}$ IEEE Conference on Decision and Control 2008, which is hereby incorporated by reference herein in its entirety. Other possible approaches may include evaluation of possible hypotheses at each time step corresponding to possible evolutions of the Boolean inputs (i.e., possible appliance models turning on/off); an example implementation of such an approach may be similar to the multiple hypothesis trajectory tracking approach mentioned and referenced above by Hofbaur et. al. With the use of Boolean inputs in this approach, multiple appliances can be readily estimated as having been turned on at various (possibly overlapping) times through the estimation of many different combinations of the Boolean inputs.

In the embodiment illustrated in FIGS. 1-2, Appliance 1 is shown as being modeled by equations (1) and (2):

$$\frac{dx_1}{dt} = A_1 x_1(t) + B_1 u(t) \quad (1)$$

$$y = C_1 x_1(t) + D_1 u(t) \quad (2)$$

wherein y(t) is an observable output of a discrete state (e.g., appliance) of the overall system, and u(t) is an input of the discrete state. For example, y(t) may be a power consumption level of building 10 as measured by voltmeter 14 and ampmeter 16, and u(t) may be a step voltage applied to the appliance when the appliance is turned on. The output y(t) may be other measurable parameters pertaining to electricity consumption such as the direct voltage or current measurements. Also, this output may be a multi-dimensional vector; for instance, it may include both real and reactive power or also power from the multiple phases supplied to a building (e.g. each leg of the split phase supply in a typical residential building in the United States). The variable $x_1(t)$ may be any parameter associated with operation of appliance 1; however, according to the invention, it may not be necessary to identify the parameter represented by $x_1(t)$. That is, it may not be necessary to know the physical meaning of $x_1(t)$ in order to determine that appliance 1 is operating or that appliance 1 has been recently turned on. In this respect, any of appliances 1-4 may be treated as a black box having only a known input and a known output. As just one example, $x_1(t)$ may be a rotational speed of a motor within appliance 1.

The values of coefficients A, B, C and D for each appliance may be provided by the appliance manufacturer, may be pre-determined via experimentation, may be obtained through systems identification techniques when the appliance is first used or discovered, may be formulated from the knowledge about the physics of the device, and/or may be stored in a repository accessible to processor 18, either locally or through internet 20. It is to be understood that the superscripts 1-3 associated with the coefficients $A_2$, $B_2$, $C_2$ and $D_2$ of appliance 2 in FIGS. 1-2 designate a respective one of phases 1-3 and are not to be interpreted as exponents of the coefficients.

In one embodiment in which a Kalman filter is used, any number may be used as an initial value of each of $x_{1-4}(t=0)$, wherein t=0 may be defined as the time at which the estimation system begins operation. As one example, a value of 0 or a value of 1 may be used as an initial value of each of $x_{1-4}(t=0)$. An initial observed measurement of y at t=0 may be plugged into the models and new predicted values of each of $x_{1-4}(t=1)$ may be produced by the Kalman filter. A next observed measurement of y at t=1 may be plugged into the models and corrected values of each of $x_{1-4}(t=1)$ may be determined through computations that compare the actual observed value of y at t=1 to the predicted value suggested by the predicted value of each of $x_{1-4}(t=1)$. In one specific embodiment, about forty measurements of y are taken per second. The process of observing measurements of y and correcting predicted values of $x_{1-4}$ may continue until, for one of the appliances, the difference between the predicted values and the actual values are small. It may be thus determined that that appliance whose predicted and actual values of x have converged is the appliance that was turned on at or around t=0. That is, the appliance for which the prediction errors of x are clearly smallest may be assumed to be the appliance that has been turned on. It may take as few as four measurements of y before an appliance that has been turned on can be identified.

According to the invention, the determination of which appliance has been turned on may be based not only upon the hybrid estimation approach described above, but also on known patterns of operation of the appliances and/or the people or automatic control devices that control the appliances. In one embodiment, processor 18 learns the behavioral patterns of users occupying building 10. For example, processor 18 may learn from prior experience, or may be programmed to consider, that an appliance in the form of a dishwasher within building 10 is often turned on within five minutes of another appliance in the form of a television being turned off. Thus, if there is some uncertainty remaining after the hybrid estimation about whether the dishwasher or some other appliance with similar electrical characteristics has been turned on, and it is known that the television has been turned off within the past five minutes, then processor 18 may deem it more likely that it is the dishwasher that has been turned on. This information may be accounted for in transition probabilities between discrete states or modes and in the mode likelihood metric that is computed as a function of both the error metric of the parameters (or continuous states) of each appliance model and the parameters of the discrete model (i.e., transition probabilities). This information may also be accounted for in discrete (Boolean) inputs of single dynamic system model that encompasses the dynamics of all appliances; in such a case, the switching probabilities of these discrete inputs represent appliance operation or user behavior.

As an example of automatic control of the appliances that may be considered by processor 18 when deciding what appliance has been turned on, a residential control system may be programmed to turn on an appliance in the form of a heat pump within one minute of a security alarm system being disarmed, and thus processor 18 may be able to quickly decide with a small number of output readings, and with a high degree of confidence, that the heat pump has been turned on if it is less than one minute since the alarm system has been disarmed. This particular pattern could also be learned as a behavioral pattern of the occupants.

As yet another example of automatic control of the appliances that may be considered by processor 18 when deciding what appliance has been turned on, it may be known that when appliance 2 is operating in phase 1, at some point it time, or at some predetermined point in time, the operation will proceed from phase 1 to phase 2. Thus, when appliance 2 is operating in phase 1, processor 18 may assign a high probability that a change in output y is due to a shift from phase 1 to phase 2. Similarly, when appliance 2 is operating in phase 2, processor 18 may assign a high probability that a change in output y is due to a shift from phase 2 to phase 3 because processor 18 may be programmed with the information that phase 3 generally follows phase 2, or processor 18 may have learned such a generality from its own observation and analysis of prior appliance operation patterns. Quantification of these phase transitions may again be accounted for in the parameters of the discrete model such as transition probabilities and are incorporated in the mode likelihood metric along with error metrics computed from the continuous state estimates of each mode.

The continuous models for each appliance may be made available in different ways. First, a repository of appliance models may be made accessible by processor 18 through a local or remote database. For instance, the non-intrusive load monitoring system shown in FIG. 1 may have some local storage for appliance models that is populated by the user or by the appliance manufacturer with accurate appliance models that are already available from the appliance manufacturer or another source. Such a repository may also reside remotely, for example, on a server owned by the manufacturer.

An alternative to obtaining or retrieving the continuous appliance models is for a training or learning process to occur with the assistance of the user. For instance, when a new device or appliance is installed, the user may be prompted by the system to turn the device on or off while the non-intrusive load monitoring system observes the resulting dynamics in the measured observations and fits a continuous model to the device. This model may then be stored in a local or remote repository for later use during estimation. Also, if the estimation process detects with a high probability that the estimated discrete state (e.g., appliance) does not belong to any of the discrete states that are part of the current hybrid model, then the system may prompt the user to indicate whether a new device has just recently been activated, and, if so, what the device was (i.e., identify the newly-activated device). The system may then learn a new model for that new device.

The continuous models for each appliance may be constantly and continuously monitored over time to either update the accuracy of the model or to determine whether the appliance or device is deteriorating in performance or quality. For instance, in the case of updating the model, each time the hybrid estimator detects that a new appliance has just recently turned on (with some high probability), the estimated continuous state (e.g., x(t)) of the appliance may be used as another training instance for the system identification component. Or, in the case of appliance performance monitoring, the error of the estimated continuous state of the system from the hybrid estimator with respect to the "true" continuous model may be monitored so that large errors can be reported to the user as possible abnormalities that may be indicative of the appliance malfunctioning, being in need of maintenance or repair, or being near the end of its useful life.

The computational technique use for systems identification may vary, and a variety of techniques can be applied. In general, such techniques may be designed to find the best fit for the parameters of a particular continuous model structure (e.g., parameters of a transfer function, state-space model, or autoregressive model) given the measured output of the system. In the case of non-intrusive load monitoring, the measured output of the system may be the current, voltage or power for the total load, for example.

Figure 3:
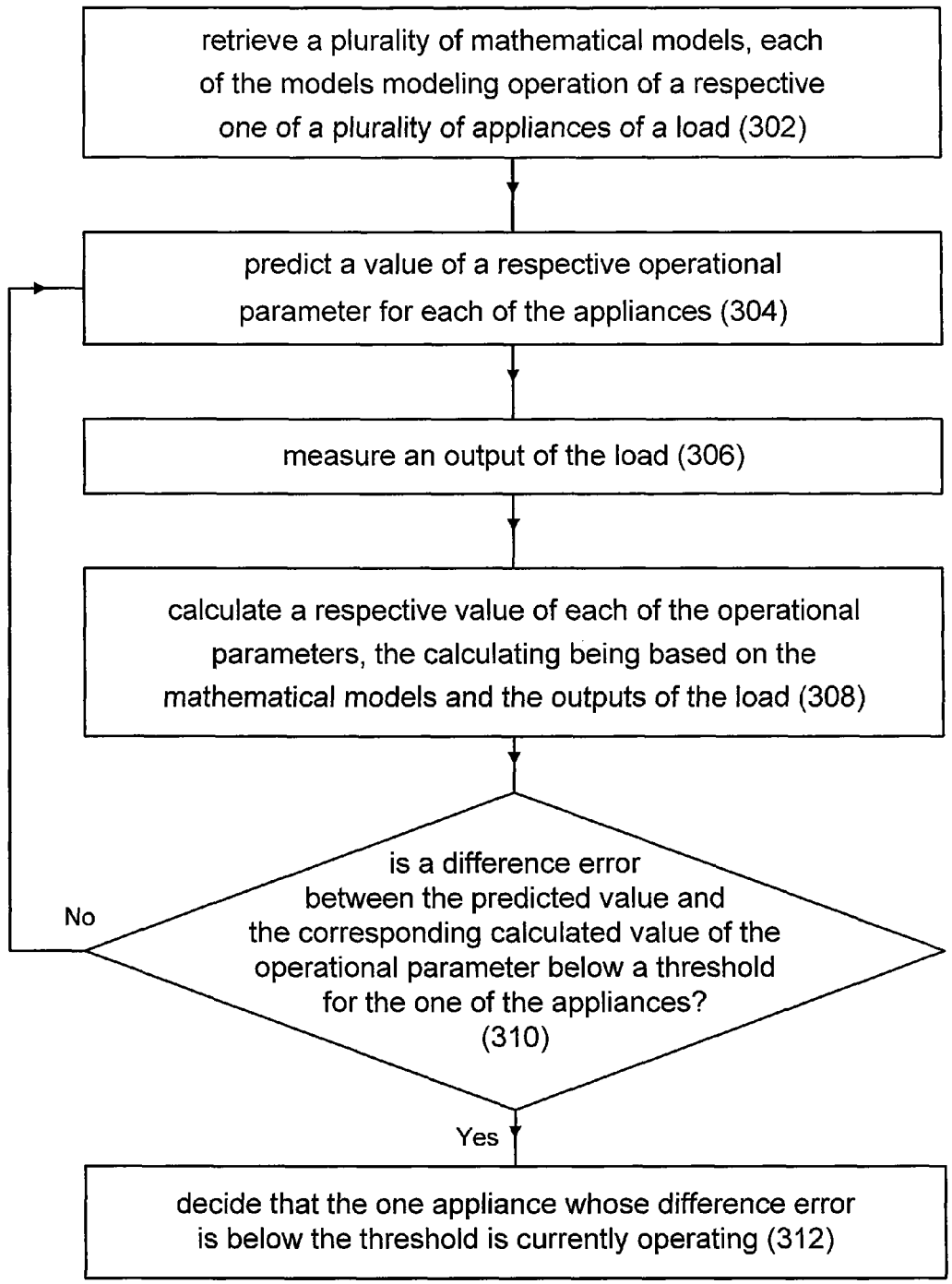
FIG. 3 is a flow chart of one embodiment of a method of the present invention for non-intrusively monitoring a load.

In FIG. 3, there is shown one embodiment of a method 300 of the present invention for non-intrusively monitoring a load. In a first step 302, a plurality of mathematical models are retrieved. Each of the models is for modeling operation of a respective one of the appliances. For example, processor 18 may retrieve mathematical models for modeling operation of appliances 1-4, including a respective model for each of the three phases of appliance 2. Processor 18 may retrieve these models from a local memory device or from a remote repository of such models. Processor 18 may retrieve the remote models via internet 20, for example.

In one embodiment, the retrieved models function to model operation of the appliances as having continuous dynamics. That is, the respective state vectors x(t) associated with the appliances may be continuous functions. Moreover, the retrieved models may function to model the appliances conjunctively as a discrete state system. That is, the system may have a plurality of discrete states each representing a respective combination of the appliances 1-4, and the phases 1-3 of appliance 2, that are actively in operation at any given time.

In a next step 304, a value of a respective operational parameter is predicted for each of the appliances. An initial value may be assigned to the continuous state vector within the mathematical model. In one embodiment, a random number may be assigned to the initial value of the continuous state vector. However, an initial value of the continuous state vector may be assigned as a particular predetermined value such as zero or one, for example. It is also possible for the initial value of the continuous state vector to be selected as a function of the coefficients A-D. For example, the initial value of the continuous state vector may be selected to be some number on the same order of magnitude as coefficients A and/or C. Alternatively, initial states may be assigned based on previous knowledge and understanding of the device; for example, they may be selected based on steady state values of the continuous state during the systems identification or training phase for the device.

Next, in step 306, an output of the load is measured. For example, in one embodiment, the readings of voltmeter 14 and ammeter 16 may be used within processor 18 to determine or "measure" a level of power consumption of appliances 1-4 combined (although it is to be understood that less than all of appliances 1-4 may be operating and thereby consuming power). The power output may be multi-dimensional in that it includes real and reactive power or power from different phase supplies of the building. In other embodiments, the output may be in the form of the reading of voltmeter 14 or the reading of ammeter 16 alone.

It is also possible for the output of the load to be neither voltage, current nor power, but rather be some other electrical characteristic that is dependent upon the number of appliances that are operating. For example, the electrical impedance of the load may depend upon which and how many of the appliances are operating, and thus the electrical impedance of the load may be used as the output of the load.

In step 308, a respective value of each of the operational parameters is calculated. The calculating may be based on the mathematical models and the outputs of the load. For example, the predicted operational parameter is updated based on the newly observed output measurement through an update equation of the form $\hat{x}_{k|k} = \hat{x}_{k|k-1} + L(y-\hat{y})$ where $\hat{x}_{i|j}$ is the estimate of the operational parameters at time i given measurements through time $j \leq i$, and $\hat{y}$ and L are computed from mathematical equations dependent upon model parameters. In classical Kalman filtering, L is dependent on the covariance of the state estimation error, which is recursively updated with each new observation at every time step. There are many other approaches to state estimation that may also be used in a similar manner, including but not limited to extended Kalman filtering (in the case of nonlinear system models), Luenberger observers (in the absence of noise), particle filtering, or other Bayesian filters.

In step 308, a respective value of each of the operational parameters is calculated. The calculating may be based on the mathematical models and the outputs of the load. As another example, the measured load output y may be inserted into Equation (2) of each of the appliance models to thereby solve for x(t) for each of the appliances. The calculated values of x(t) may then be inserted into Equation (1) of each of the appliance models to thereby solve for dx/dt for each of the appliances.

In a next step 310, the predicting, measuring and calculating steps are repeated until a difference error between the predicted value and the corresponding calculated value of the operational parameter is below a threshold for one of the appliances. For example, the calculated values of x(t) and dx/dt may be used to derive a predicted next value for x(t) for each of the appliances. Corresponding to each predicted next value of x(t) may be a new measurement of output y(t) of the load. From the new load output measurement y(t) and the appliance models, calculated values of x(t) may be obtained. A difference error between the predicted value for x(t) and the calculated value of x(t) may be determined by subtracting the calculated value from the predicted number. The predicting, measuring and calculating steps as described above may be repeated until the difference error is below a threshold for one of the appliances. When a Kalman filter is used, the difference error may typically get smaller with each subsequent round of predicting, measuring and calculating. In one embodiment, the threshold may be in the form of a fixed percentage, such as five percent, of the predicted value for x(t). In another embodiment, the threshold may be in the form of a fixed value that is independent of the predicted value for x(t). In yet another embodiment, the threshold is the current minimum threshold error among all the appliances. That is, the difference error must be (equal to, rather than below) the smallest available difference error among all the appliances.

In a final step 312, it is decided that the one appliance whose difference error is below the threshold (or equal to the threshold, when the threshold is defined as the smallest current difference error) is currently operating. That is, it may be assumed that the appliance whose mathematical model best fits and is consistent with the measured values of y(t) is the appliance that has recently turned on. In one embodiment, the decision that a particular appliance is running is made only if the decision can be made with a certain degree of confidence. For example, the decision may be made only if it is at least ninety-five percent certain that the appliance is the one that has most recently started running. Thus, at least in one embodiment, even though the difference error associated with a first appliance is below the threshold, the decision that the first appliance is running may not be made if the difference error associated with a second appliance is above the threshold, but is nonetheless comparable to the difference error associated with the first appliance. In that case, one or more additional rounds of predicting, measuring and calculating may be performed until it can be determined with greater certainty that a particular appliance is the one that has been most recently turned on.

Figure 4:
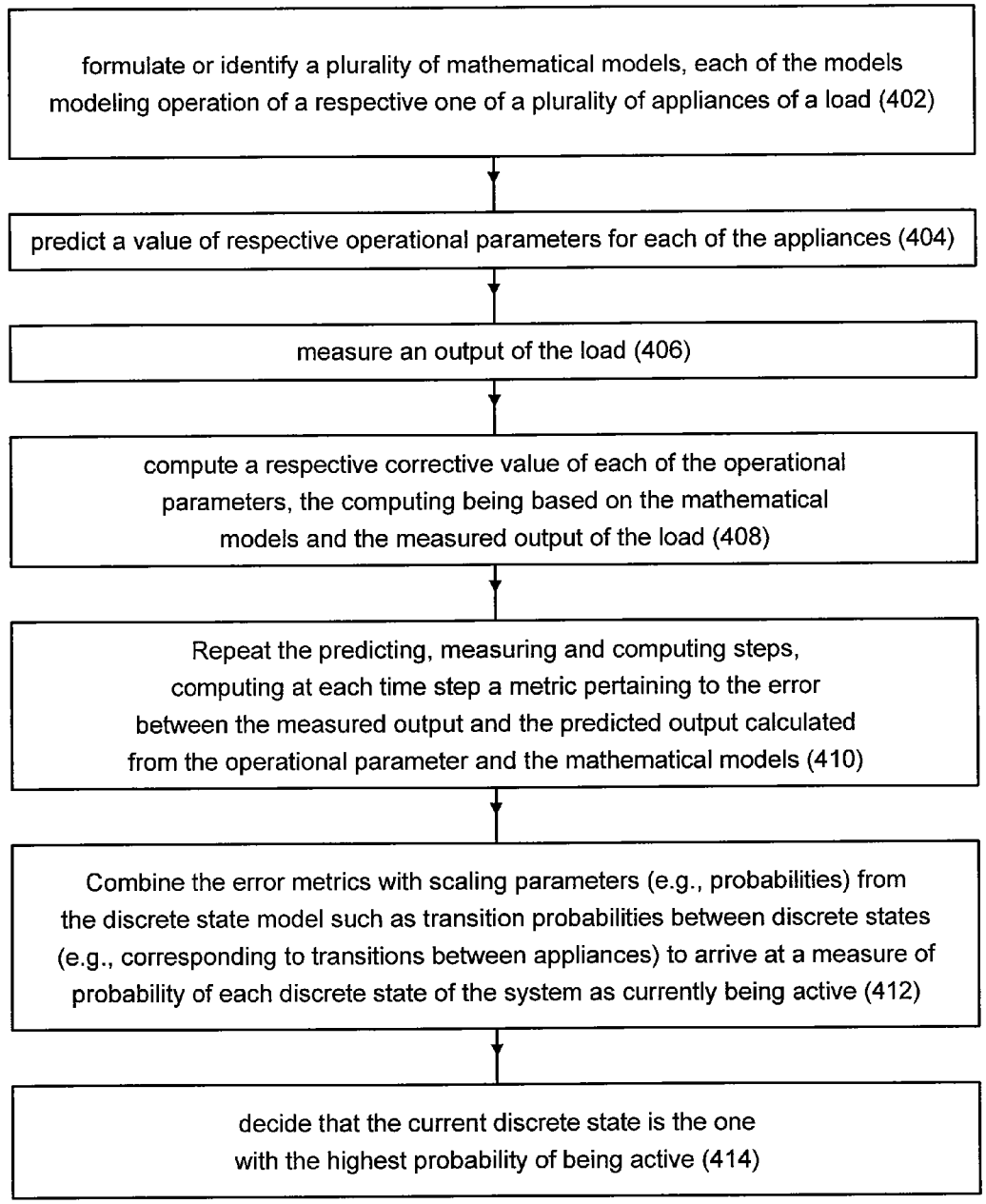
FIG. 4 is a flow chart of another embodiment of a method of the present invention for non-intrusively monitoring a load.

In FIG. 4, there is shown another embodiment of a method 400 of the present invention for non-intrusively monitoring a load. In a first step 402, a plurality of mathematical models are formulated. Each of the models may be for modeling operation of a respective one of the appliances. In a next step 404, a value of a respective operational parameter is predicted for each of the appliances. Next, in step 406, an output of the load is measured. In step 408, a respective value of each of the operational parameters is computed. The computing may be based on the mathematical models and the measured output of the load. In a next step 410, the predicting, measuring and computing steps are repeated. At each time step, a metric is computed pertaining to the error between the measured output and the predicted output calculated from the operational parameter and the mathematical models. Next, in step 412, the error metrics are combined with scaling parameters (e.g., probabilities) from the discrete state model such as transition probabilities between discrete states (e.g., corresponding to transitions between appliances) to arrive at a measure of probability of each discrete state of the system as currently being active. In a final step 414, it is decided that the current discrete state is the one with the highest probability of being active.

Other factors may be involved in the decision that a particular appliance is the one that has most recently been turned on. For example, known behavioral patterns of one or more particular users, or of users in general, may be considered in making the decision. Empirical data may show that a particular appliance is always, or almost always, turned on before another particular appliance is turned on, for example. Alternatively, empirical data may show, or it may be programmed into processor 18, that operation of phase 2 of appliance 2 always follows phase 1, and in turn, operation of phase 3 always follows phase 2.

The invention has been described herein as being used to determine which appliance has been recently turned on or off. In case of the special discrete state equivalent to all the relevant appliances of interest are off, there may still be a baseline load observed at the output. In one embodiment, a continuous model may be used for this special discrete state where all the devices of interest are off. This model may be formulated or obtained or identified separately using system identification techniques. In such a case, the variation patterns of the baseline load according to the behavior patterns of the residents in a building, for example, would be a factor to consider while building the model. In another embodiment, the baseline power consumption may just be treated as a baseline load assumed to behave like random noise of particular characteristics, e.g. Gaussian noise with nonzero mean. The value of nonzero mean can either be assumed to be known from the past usage history, measured by observing the measured values over some interval, or estimated using bias-estimation techniques. As an example, the bias may be directly estimated as part of the Kalman filter, e.g., by appending the unknown bias to the state vector so that it is also estimated. Other techniques may also be used such as two-stage estimation involving unbiased estimation followed by biased estimation.

The invention has been described herein as being primarily applied to determining whether a single appliance is turned on. However, it is to be understood that the invention also extends to determining whether any subset of appliances is turned on, wherein a "subset" may be any single appliance, any combination of multiple appliances, or even all of the appliances together. Further, each subset of appliances may correspond to a respective mathematical model and/or one or more operational parameters. It is possible to treat each subset of appliances as a stand alone appliance within the scope of the invention.

While this invention has been described as having an exemplary design, the present invention may be further modified within the spirit and scope of this disclosure. This application is therefore intended to cover any variations, uses, or adaptations of the invention using its general principles.

What is claimed is:

1. A method for non-intrusively monitoring a load including a plurality of appliances, the method comprising:
    retrieving a plurality of mathematical models, each of the models modeling operation of a respective subset of the appliances;
    predicting a value of a respective operational parameter for each said subset of the appliances;
    measuring an output of the load;
    calculating a respective value of each of the operational parameters, the calculating being based on the mathematical models and the output of the load;
    repeating the predicting, measuring and calculating steps until a metric pertaining to a difference error between the predicted value and the corresponding calculated value of the operational parameter is equal to or below a threshold for one said subset of the appliances; and
    deciding that each said appliance in the one said subset of the appliances whose metric pertaining to the difference error is equal to or below the threshold is currently operating.

2. The method of claim 1 wherein the operational parameter comprises a continuous state vector.

3. The method of claim 1 wherein the output of the load comprises a level of power consumption of the load.

4. The method of claim 1 wherein each of the models functions to model operation of a respective one said subset of the appliances as having continuous dynamics.

5. The method of claim 1 wherein the models function to model operation of the appliances conjunctively as a discrete state system.

6. The method of claim 1 wherein the deciding step is dependent upon known probabilities associated with transitions between appliances or appliance stages and/or behavior of a user.

7. The method of claim 1 wherein the deciding step is dependent upon the metric pertaining to the difference error for the one said subset of appliances being below a threshold percentage of each of the metrics pertaining to the difference error of all other said subsets of appliances.

8. A method for non-intrusively monitoring a load including a plurality of appliances, the method comprising:
    retrieving a plurality of mathematical models, each of the models modeling operation of a respective subset of the appliances as having continuous dynamics, the models modeling the appliances conjunctively as a discrete state system;
    predicting a value of a respective operational parameter for each said subset of the appliances;
    measuring an output of the load;
    calculating a respective value of each of the operational parameters, the calculating being based on the mathematical models and the output of the load; and
    deciding which of the subsets of appliances has most recently begun operating, the deciding being based upon the predicted and calculated values of the operational parameters of the subsets of appliances.

9. The method of claim 8 wherein the output of the load comprises a level of power consumption of the load.

10. The method of claim 8 wherein the deciding step is dependent upon known probabilities associated with transitions between appliances or appliance stages and/or behavior of a user.

11. The method of claim 8 comprising the further step of repeating the predicting, measuring and calculating steps until a metric pertaining to a difference error between the predicted value and the corresponding calculated value of the operational parameter is below a threshold for one of the subsets of appliances.

12. The method of claim 11 wherein the deciding step includes deciding that the one subset of appliances whose metric pertaining to a difference error is below the threshold is currently operating.

13. The method of claim 11 wherein the deciding step is dependent upon the metric pertaining to a difference error for the one subset of appliances being below a threshold percentage of each of the metrics pertaining to a difference error of all other said subsets of appliances.

14. The method of claim 8 wherein the operation of one of the appliances includes a plurality of phases, each of the phases being modeled by a respective said model.

15. A method for non-intrusively monitoring a load including a plurality of appliances, the method comprising:
    obtaining a plurality of mathematical models, each of the models modeling operation of a respective subset of the appliances, each of the models being of the form:

$$\frac{dx_n}{dt} = A_n x_n(t) + B_n u(t)$$

$$y = C_n x_n(t) + D_n u(t)$$

wherein $x_n$ is a continuous state vector of an $n^{th}$ said subset of appliances, $u(t)$ is a step voltage input to a corresponding said subset of appliances, y is an output of each discrete state of the load, and each of $A_n$, $B_n$, $C_n$ and $D_n$ is a coefficient corresponding to said $n^{th}$ subset of appliances;
    predicting a value of $x_n$ for each of the subsets of appliances;
    measuring a value of y;
    calculating a respective value of $x_n$ for each of the subsets of appliances, the calculating being based on the mathematical models and the measured value of y; and
    deciding which of the subsets of appliances has most recently begun operating, the deciding being based upon the predicted and calculated values of $x_n$.

16. The method of claim 15 wherein the output of the discrete state of the load comprises a level of power consumption of the discrete state of the load.

17. The method of claim 15 wherein the deciding step is dependent upon known probabilities associated with transitions between appliances or appliance stages and/or behavior of a user.

18. The method of claim 15 comprising the further step of repeating the predicting, measuring and calculating steps until a difference error between the predicted value and the corresponding calculated value of $x_n$ is below a threshold for one of the subsets of appliances.

19. The method of claim 18 wherein the deciding step includes deciding that the one subset of appliances whose difference error is below the threshold is currently operating.

20. The method of claim 18 wherein the deciding step is dependent upon the difference error for the one subset of appliances being below a threshold percentage of each of the difference errors of all other said subsets of appliances.

* * * * *